US012768433B2

(12) United States Patent
Amemiya et al.

(10) Patent No.: US 12,768,433 B2
(45) Date of Patent: Oct. 20, 2026

(54) BALL SCREW

(71) Applicant: THK CO., LTD., Tokyo (JP)

(72) Inventors: Yohei Amemiya, Tokyo (JP); Yuki Hayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 19/113,294

(22) PCT Filed: Sep. 19, 2023

(86) PCT No.: PCT/JP2023/033815
§ 371 (c)(1),
(2) Date: Mar. 19, 2025

(87) PCT Pub. No.: WO2024/063032
PCT Pub. Date: Mar. 28, 2024

(65) Prior Publication Data

US 2026/0098573 A1 Apr. 9, 2026

(30) Foreign Application Priority Data

Sep. 21, 2022 (JP) ................................ 2022-149823

(51) Int. Cl.
*F16H 25/22* (2006.01)

(52) U.S. Cl.
CPC ................................ *F16H 25/2223* (2013.01)

(58) Field of Classification Search
CPC ... F16H 25/2223; F16H 25/2214; F16H 25/24
See application file for complete search history.

(56) References Cited

U.S. PATENT DOCUMENTS 7,860,592 B2 * 12/2010 Kimura .............. G05B 19/4103 703/2
10,663,043 B2 * 5/2020 Asakura .............. F16H 25/2214
(Continued)

FOREIGN PATENT DOCUMENTS

CN 113767234 A * 12/2021 ......... F16H 25/2204
JP 2005-273899 A 10/2005
(Continued)

OTHER PUBLICATIONS

International Search Report dated Nov. 14, 2023, issued in counterpart International Application No. PCT/JP2023/033815. (2 pages).

*Primary Examiner* — Jake Cook
(74) *Attorney, Agent, or Firm* — WHDA, LLP

(57) ABSTRACT

Provided is a ball screw where a three-dimensionally formed recirculation trajectory of a recirculation groove can be connected to a helical trajectory in such a manner that the tangential directions thereof are substantially continuous. A ball screw (1) includes: a ball screw shaft (2) including a helical groove (**2*a*); a ball nut (3) including a helical groove; and a plurality of balls (4) placed between the helical groove (2*a*) of the ball screw shaft (2) and the helical groove of the ball nut (3). The ball nut (3) is provided with a recirculation groove that is connected to one end and the other end of the helical groove of the ball nut (3) to recirculate the balls (4). A recirculation trajectory (8) of the recirculation groove is formed on the basis of a groove cross-sectional trajectory curve representing a trajectory along which the balls (4) are recirculated in a groove cross-section of the ball screw shaft (2), and a longitudinal trajectory curve representing a trajectory along which the balls (4**) are recirculated in a virtual plane where a trajectory length ω of the groove cross-sectional trajectory curve is an H-axis and a helical trajectory length $F_v(\omega)$ is a V-axis.

4 Claims, 14 Drawing Sheets

(56) References Cited

U.S. PATENT DOCUMENTS

| | | | | |
|---|---|---|---|---|
| 11,391,350 | B2 * | 7/2022 | Oka | F16H 25/24 |
| 11,506,269 | B2 * | 11/2022 | Oka | F16H 25/22 |
| 2007/0293962 | A1 | 12/2007 | Kimura et al. | |

FOREIGN PATENT DOCUMENTS

| | | | |
|---|---|---|---|
| JP | 2006-132689 | A | 5/2006 |
| JP | 2017-89707 | A | 5/2017 |

* cited by examiner (a)

(b)

BALL SCREW

TECHNICAL FIELD

The present invention relates to a ball screw.

BACKGROUND ART

A ball screw is used to convert rotary motion to linear motion and vice versa. The ball screw includes a ball screw shaft having a helical groove, a ball nut having a helical groove, and a plurality of balls placed between the helical groove of the ball screw shaft and the helical groove of the ball nut. The ball nut is provided with a return path connected to one end and the other end of the ball nut helical groove to recirculate the balls.

Examples of the return path include a return pipe type and a deflector type. In a deflector type ball screw, a deflector (also referred to as an internal deflector) is attached to a ball nut, and a recirculation groove for recirculating balls to the deflector is formed as a return path (refer to Patent Literature 1).

As illustrated in FIG. 14, in a known deflector type ball screw, a recirculation trajectory 36 (refer to FIG. 14(*c*)) of balls moving along a recirculation groove is formed on the basis of an axial horizontal plane trajectory curve 31 (refer to FIG. 14(*a*)) and an axial cross-sectional trajectory curve 32 (refer to FIG. 14(*b*)). The axial horizontal plane trajectory curve 31 illustrated in FIG. 14(*a*) is a curve representing a trajectory along which the balls recirculate in an axial horizontal plane, and has, for example, an approximately S-shape. The axial cross-sectional trajectory curve 32 illustrated in FIG. 14(*b*) is a curve representing a trajectory along which the balls recirculate in a normal cross-section of a ball screw shaft 30, and has, for example, an approximately inverted U-shape.

In addition, as illustrated in FIG. 14(*c*), a curved surface 34 is formed by sweeping (pushing out) the approximately S-shaped axial horizontal plane trajectory curve 31 in an up-and-down direction, a curved surface 35 is formed by sweeping the approximately inverted U-shaped axial cross-sectional trajectory curve 32 in an axial direction, and a line where the curved surface 34 and the curved surface 35 intersect is set as the recirculation trajectory 36 of the recirculation groove. Note that dot-and-dash lines in FIGS. 14(*a*) and 14(*b*) indicate a helical trajectory 33 (a helical trajectory of the balls moving between the helical groove of the ball screw shaft and the helical groove of the ball nut).

CITATION LIST

Patent Literature

Patent Literature 1: JP 2006-132689 A

SUMMARY OF INVENTION

Technical Problem

However, as illustrated in an enlarged view of FIG. 14(*d*), the known recirculation trajectory 36 of the recirculation groove has a problem not being connected to the helical trajectory 33 in such a manner that the tangential directions thereof are continuous. Even if the axial horizontal plane trajectory curve 31 is connected to the helical trajectory 33 in such manner that the tangential directions thereof are continuous in the axial horizontal plane as illustrated in FIG. 14(*a*), and the axial cross-sectional trajectory curve 32 is connected to the helical trajectory 33 in such a manner that the tangential directions thereof are continuous in the normal cross-section as illustrated in FIG. 14(*b*), the recirculation trajectory 36 formed three-dimensionally as illustrated in FIGS. 14(*c*) and 14(*d*) is not connected to the helical trajectory 33 in such a manner that the tangential directions are continuous. Hence, the recirculation trajectory has a problem not being so designed to allow the balls to move smoothly.

The present invention has been made in view of the above problem, and an object of the present invention is to provide a ball screw where a three-dimensionally formed recirculation trajectory of a recirculation groove can be connected to a helical trajectory in such a manner that the tangential directions thereof are substantially continuous.

Solution to Problem

In order to solve the above problem, one aspect of the present invention is a ball screw including: a ball screw shaft including a helical groove; a ball nut including a helical groove; and a plurality of balls placed between the helical groove of the ball screw shaft and the helical groove of the ball nut, the ball nut being provided with a recirculation groove that is connected to one end and the other end of the helical groove of the ball nut to recirculate the balls, in which a recirculation trajectory of the recirculation groove is formed on the basis of a groove cross-sectional trajectory curve representing a trajectory along which the balls are recirculated in a groove cross-section of the ball screw shaft, and a longitudinal trajectory curve representing a trajectory along which the balls are recirculated in a virtual plane where a trajectory length ω of the groove cross-sectional trajectory curve is an H-axis and a helical trajectory length $F_v(\omega)$ is a V-axis, the helical trajectory length $F_v(\omega)$ of the longitudinal trajectory curve from a turn start point is set as a helical trajectory length $F_v(\omega)$ of the recirculation trajectory of the recirculation groove from the turn start point, a principal normal direction coordinate $F_n(\omega)$ of the groove cross-sectional trajectory curve is set as a principal normal direction coordinate $F_n(\omega)$ to the helical trajectory length $F_v(\omega)$ of the recirculation trajectory of the recirculation groove, and a binormal direction coordinate $F_b(\omega)$ of the groove cross-sectional trajectory curve is set as a binormal direction coordinate $F_b(\omega)$ to the helical trajectory length $F_v(\omega)$ of the recirculation trajectory of the recirculation groove.

Advantageous Effects of Invention

According to one aspect of the present invention, it is possible to connect a three-dimensional recirculation trajectory of a recirculation groove to a helical trajectory in such a manner that the tangential directions thereof are substantially continuous.

DESCRIPTION OF EMBODIMENTS

An embodiment of a ball screw according to the present invention is described in detail hereinafter with reference to the accompanying drawings. However, the ball screw of the present invention can be embodied in various forms and is not limited to the embodiment described in the description. The embodiment is provided with the intention of enabling those skilled in the art to fully understand the invention by fully disclosing the description.

(Ball Screw)

Figure 1:
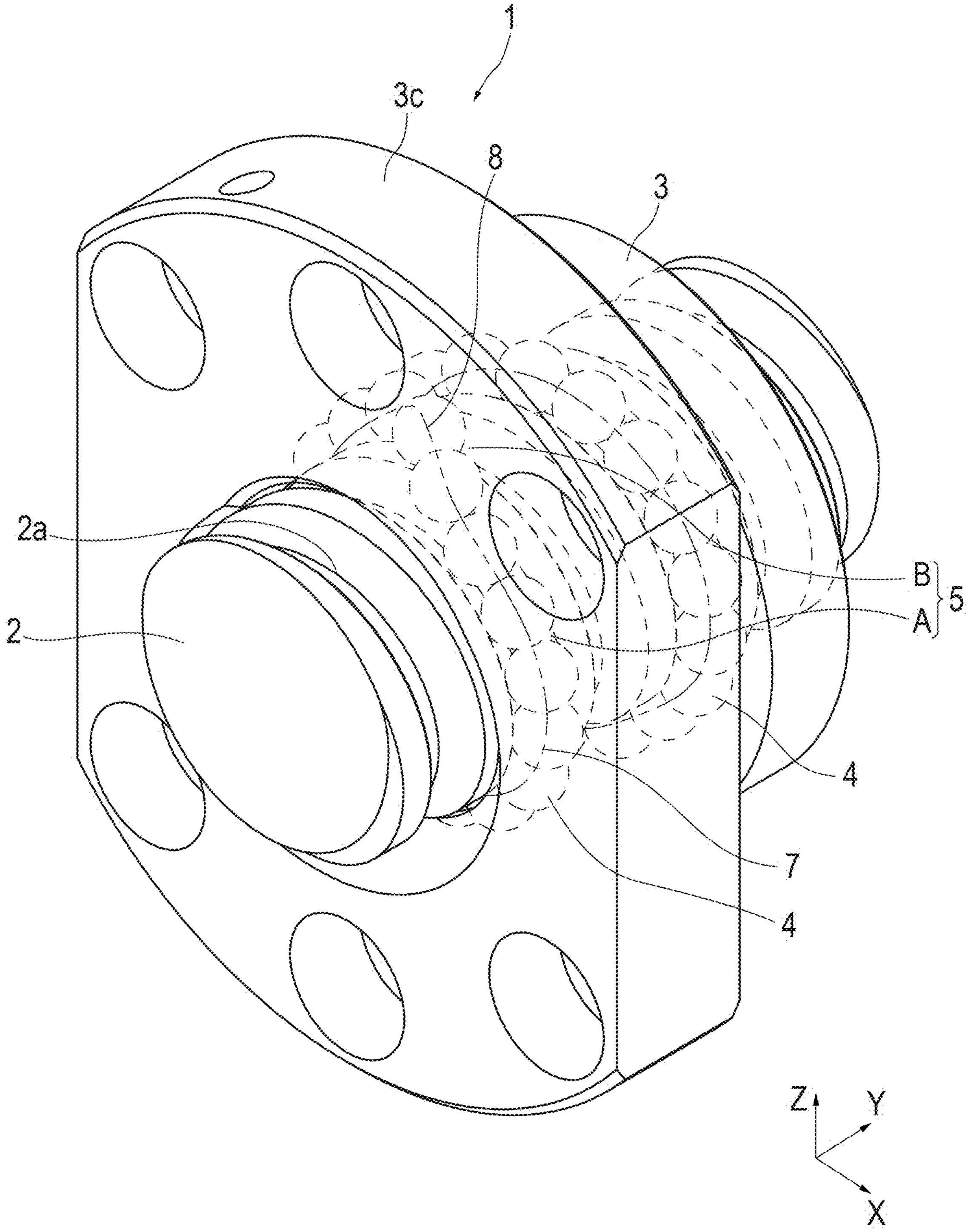
FIG. 1 is a perspective view of a ball screw of an embodiment of the present invention.
Figure 2:
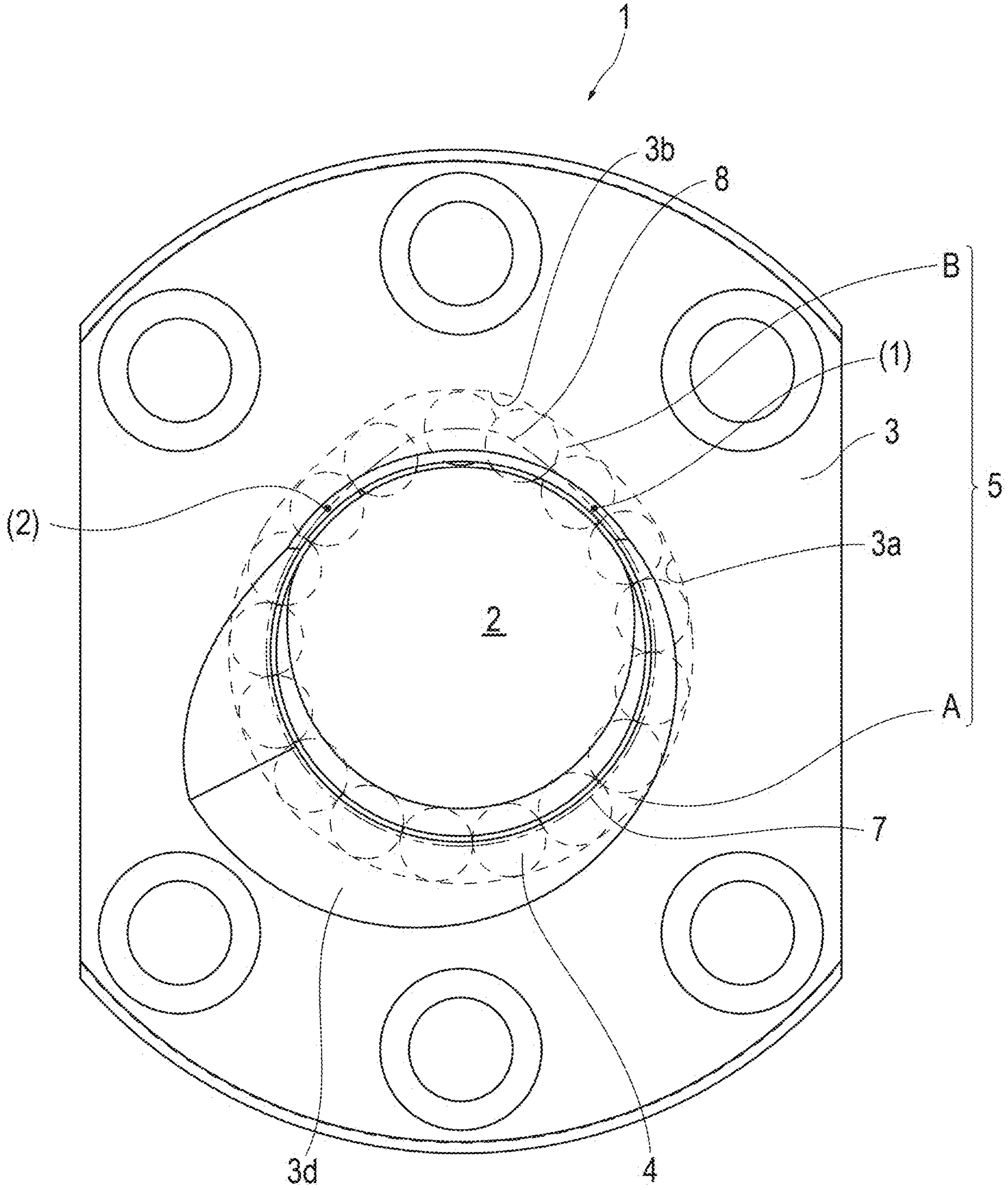
FIG. 2 is a front view of the ball screw of the embodiment.
Figure 3:
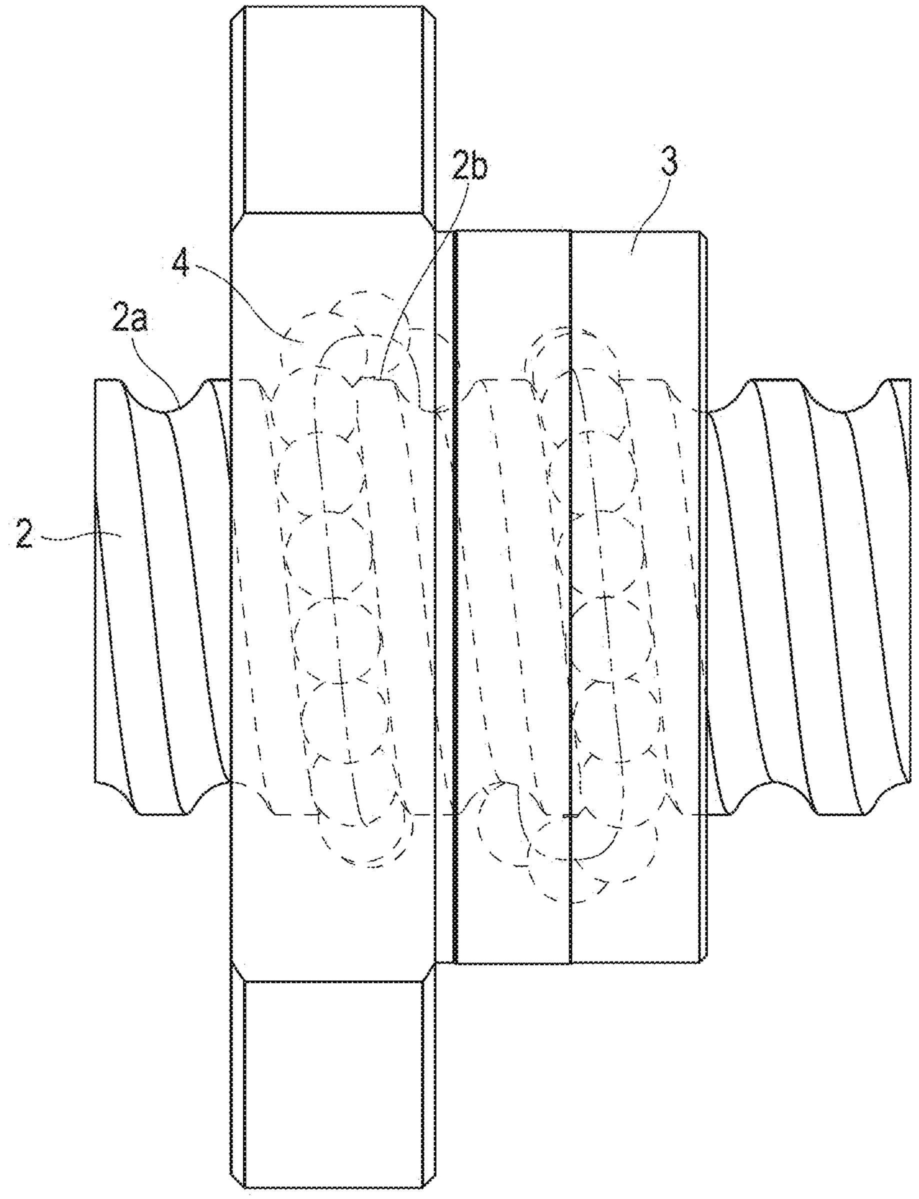
FIG. 3 is a side view of the ball screw of the embodiment.

FIG. 1 is a perspective view of a ball screw 1 of an embodiment of the present invention. FIG. 2 is a front view of the ball screw 1, and FIG. 3 is a side view of the ball screw 1.

As illustrated in FIG. 1, the ball screw 1 includes a ball screw shaft 2 having a helical groove 2*a*, a ball nut 3 having a helical groove 3*a* (refer to FIG. 2), and a plurality of balls 4 placed between the helical groove 2*a* of the ball screw shaft 2 and the helical groove 3*a* of the ball nut 3. The helical groove 2*a* of the ball screw shaft 2 is formed on an outer peripheral surface of the ball screw shaft 2. The helical groove 2*a* of the ball screw shaft 2 has a Gothic arch shape. An insertion hole into which the ball screw shaft 2 is inserted is formed in the ball nut 3. The helical groove 3*a* (refer to FIG. 2) of the ball nut 3 is formed on an inner peripheral surface of the ball nut 3. The helical groove 3*a* (refer to FIG. 2) of the ball nut 3 has a Gothic arch shape. The ball nut 3 has a flange 3*c*.

The ball screw 1 includes, for example, two recirculation paths 5. Each of the recirculation paths 5 includes a loaded path A between the helical groove 2*a* of the ball screw shaft 2 and the helical groove 3*a* of the ball nut 3, and a return path B connected to one end and the other end of the loaded path A. A recirculation groove 3*b* (refer to FIG. 2) connected to one end and the other end of the helical groove 3*a* is formed as the return path B on the inner peripheral surface of the ball nut 3. The return path B includes a recirculation groove 3*b* (refer to FIG. 2) of the ball nut 3 and a portion facing the recirculation groove 3*b* in the outer peripheral surface of the ball screw shaft 2.

When one of the ball screw shaft 2 or the ball nut 3 is rotated relative to the other, the balls 4 roll along the loaded path A and enter the recirculation groove 3*b* of the ball nut 3 at a turn start point (1) (refer to FIG. 2). In the recirculation groove 3*b*, the balls 4 climb over a crest 2*b* (refer to FIG. 3) of the ball screw shaft 2, move to an adjacent helical groove 2*a*, and reenter the loaded path A at a turn end point (2) (refer to FIG. 2). Accordingly, the other of the ball screw shaft 2 or the ball nut 3 moves relative to the one in an axial direction.

As illustrated in FIG. 1, the trajectory of the centers of the balls 4 moving along the loaded path A is a helical trajectory 7. The trajectory of the centers of the balls 4 moving along the recirculation groove 3*b* is a recirculation trajectory 8.

Note that in the ball screw 1 of the embodiment, the recirculation groove 3*b* is formed directly in the ball nut 3 in such a manner as to be continuous with the helical groove 3*a*; however, the recirculation groove 3*b* may be formed in a deflector (also referred to as an internal deflector) attached to the ball nut 3. Moreover, a recess 3*d* (refer to FIG. 2) for a machine tool for the recirculation groove 3*b* is formed in an inner diameter portion of the ball nut 3; however, the recess 3*d* may not be formed as long as the recirculation groove 3*b* can be machined.

Figure 4:
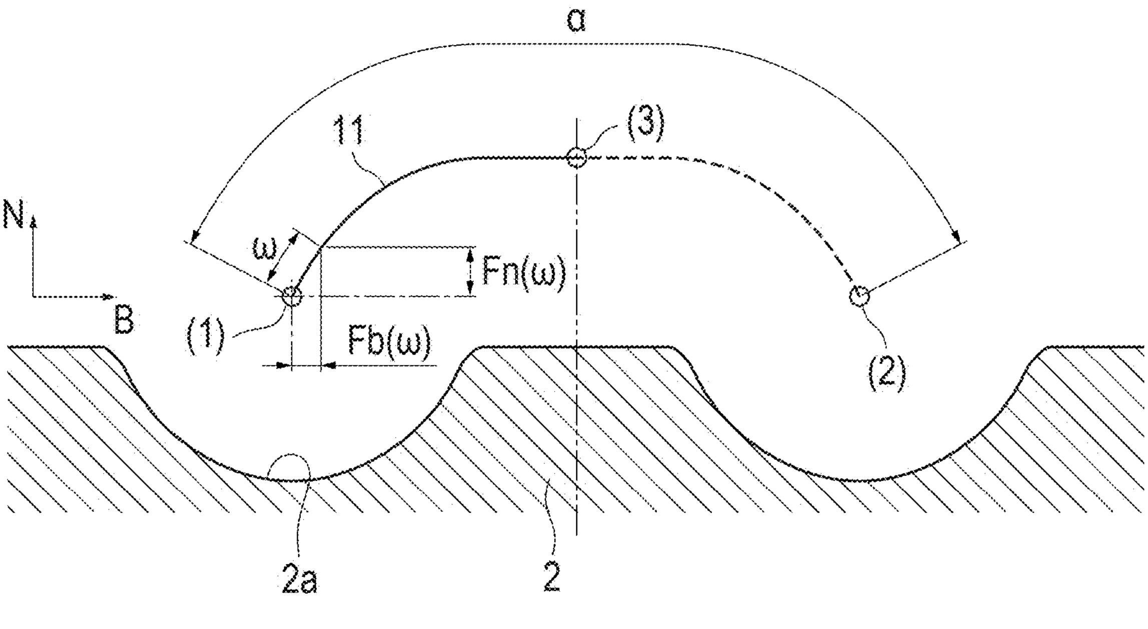
FIG. 4 is a diagram illustrating a cross-sectional trajectory curve.
Figure 5:
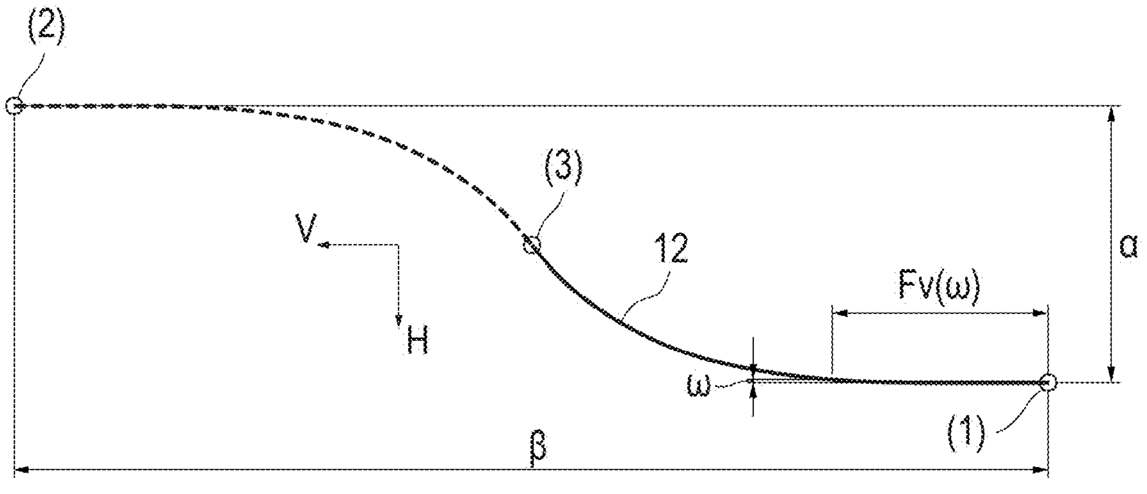
FIG. 5 is a diagram illustrating a longitudinal trajectory curve.

The recirculation trajectory 8 of the recirculation groove 3*b* is formed on the basis of a groove cross-sectional trajectory curve 11 illustrated in FIG. 4 and a longitudinal trajectory curve 12 illustrated in FIG. 5.

(Groove Cross-Sectional Trajectory Curve)

As illustrated in FIG. 4, the groove cross-sectional trajectory curve 11 is a curve representing a trajectory (actual trajectory) in which the balls 4 are recirculated in a groove cross-section of the ball screw shaft 2. Specifically, it is a curve representing a trajectory along which the balls 4 are caused to climb over the crest 2*b* of the ball screw shaft 2 and move to the adjacent helical groove 2*a*. (1) denotes the turn start point of the groove cross-sectional trajectory curve 11, and (2) denotes the turn end point of the groove cross-sectional trajectory curve 11. The groove cross-sectional trajectory curve 11 has an approximately inverted U-shape.

The coordinates of the groove cross-sectional trajectory curve 11 are expressed as $(F_b(\omega), F_n(\omega))$ where a trajectory length (curve length) $\omega$ is a variable. En $(\omega)$ is a principal normal direction (N-axis direction) coordinate, and $F_b(\omega)$ is a binormal direction (B-axis direction) coordinate. The total length of the groove cross-sectional trajectory curve 11 (the length of the groove cross-sectional trajectory curve 11 from the turn start point (1) to the turn end point (2)) is $\alpha$.

The groove cross-section (a BN plane) of the ball screw shaft 2 where the groove cross-sectional trajectory curve 11 is drawn is a cross-section perpendicular to the helical groove 2*a* of the ball screw shaft 2 (a groove normal cross-section), and is inclined by a lead angle with respect to a cross section along the axis of the ball screw shaft 2 (a YZ plane of FIG. 1). However, a difference in shapes between the helical groove 2*a* of the ball screw shaft 2 in the groove cross-section (the BN plane) and the helical groove 2*a* of the ball screw shaft 2 in the YZ plane of FIG. 1 is slight. Therefore, the YZ plane of FIG. 1 may be used as the groove cross-section of the ball screw shaft 2. Note that it is assumed in FIG. 1 that an axial direction of the ball screw 1 is a Y-axis, a height direction is a Z-axis, and a horizontal direction is an X-axis.

The groove cross-sectional trajectory curve 11 is symmetrical about a center point (3). The turn start point (1) side of the groove cross-sectional trajectory curve 11 is indicated by a solid line, and the turn end point (2) side is indicated by a broken line. The recirculation trajectory 8 (refer to FIG. 10) of the recirculation groove 3*b* is symmetrical about the center point (3); therefore, the recirculation trajectory 8 of the recirculation groove 3*b* can be formed by drawing the groove cross-sectional trajectory curve 11 on the turn start point (1) side. The groove cross-sectional trajectory curve 11 is, for example, a single arc, a plurality of arcs having different curvatures, an ellipse, a clothoid curve, or a spline curve, or a curve obtained by connecting them to a straight line, and is the curve having a tangential direction that is continuous.

(Longitudinal Trajectory Curve)

As illustrated in FIG. 5, the longitudinal trajectory curve 12 is a curve representing a trajectory along which the balls 4 are recirculated in a virtual plane (VH plane) where the trajectory length ω of the groove cross-sectional trajectory curve 11 is set on an H-axis and a helical trajectory length $F_v(\omega)$ is set on a V-axis. Specifically, it is a curve representing a trajectory along which the balls 4 are moved from the helical groove 2*a* of the ball screw shaft 2 to the adjacent helical groove 2*a* from the turn start point (1) to the turn end point (2). The longitudinal trajectory curve 12 has an approximately S-shape.

The virtual plane (VH plane) is similar to an axial horizontal plane of the ball screw 1, but is different from the axial horizontal plane of the ball screw 1. The variable ω of the H-axis of the virtual plane is not the length of the ball screw 1 in a Y-axis direction, but is the trajectory length ω of the groove cross-sectional trajectory curve 11 from the turn start point (1).

Figure 6:
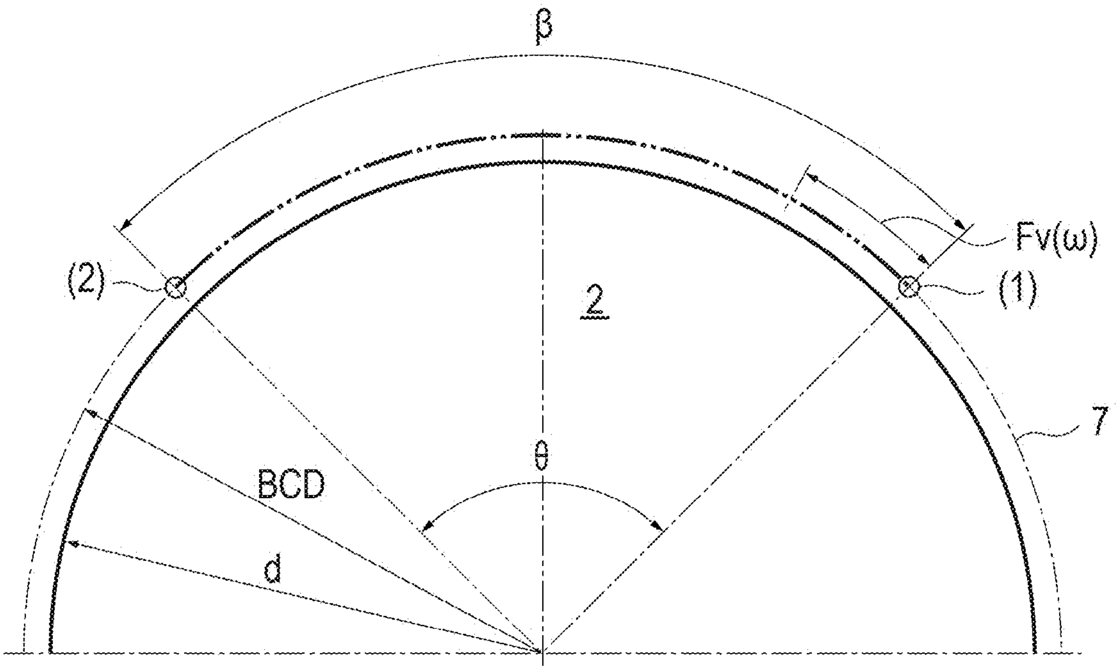
FIG. 6 is a diagram illustrating a helical trajectory length $F_v(\omega)$ (a normal cross-sectional view of a ball screw shaft).

$F_v(\omega)$ of the V-axis of the virtual plane is not the length of the ball screw 1 in an X-axis direction, but is a length $F_v(\omega)$ of the helical trajectory 7 from the turn start point (1) as illustrated in FIG. 6. In a normal cross-sectional view of the ball screw shaft 2 of FIG. 6, the helical trajectory 7 is a circle on a BCD (Ball Center Diameter). β of FIG. 6 denotes the total length of the helical trajectory length $F_v(\omega)$ (the length of the helical trajectory 7 from the turn start point (1) to the turn end point (2) (indicated by a chain double-dashed line in the drawing)). θ denotes a recirculation range, and d denotes the diameter of the ball screw shaft 2. The helical trajectory length $F_v(\omega)$ is greater by the lead angle than an arc length on the BCD illustrated in FIG. 6. However, a difference between the helical trajectory length $F_v(\omega)$ and the arc length on the BCD is slight. Therefore, the arc length on the BCD illustrated in FIG. 6 may be used as the helical trajectory length $F_v(\omega)$.

As illustrated in FIG. 5, the coordinates of the longitudinal trajectory curve 12 are expressed as a function of ω, that is, $(F_v(\omega), \omega)$. ω denotes the trajectory length of the cross-sectional trajectory curve and $F_v(\omega)$ denotes the helical trajectory length. A turn trajectory width α of the longitudinal trajectory curve 12 in an H-axis direction (the length of the longitudinal trajectory curve 12 in the H-axis direction from the turn start point (1) to the turn end point (2)) agrees with the total length α (refer to FIG. 4) of the groove cross-sectional trajectory curve 11. A turn trajectory width β of the longitudinal trajectory curve 12 in a V-axis direction (the length of the longitudinal trajectory curve 12 in the V-axis direction from the turn start point (1) to the turn end point (2)) agrees with the total length β (refer to FIG. 6) of the helical trajectory length $F_v(\omega)$.

The longitudinal trajectory curve 12 is symmetrical about the center point (3). The turn start point (1) side of the longitudinal trajectory curve 12 is indicated by a solid line, and the turn end point (2) side is indicated by a broken line. The recirculation trajectory 8 (refer to FIG. 10) of the recirculation groove 3*b* is symmetrical about the center point (3); therefore, the recirculation trajectory 8 of the recirculation groove 3*b* can be formed by drawing the longitudinal trajectory curve 12 on the turn start point (1) side. The longitudinal trajectory curve 12 is, for example, a single arc, a plurality of arcs having different curvatures, an ellipse, a clothoid curve, or a spline curve, or a curve obtained by connecting them to a straight line, and is the curve having a tangential direction that is continuous.

The tangential direction to the longitudinal trajectory curve 12 substantially agrees with the V-axis direction of the virtual plane at the turn start point (1). Moreover, the tangential direction to the longitudinal trajectory curve 12 agrees with the V-axis direction of the virtual plane at the turn end point (2). It is desirable that the tangential direction to the longitudinal trajectory curve 12 at both the turn start point (1) and the turn end point (2) substantially agree with the V-axis direction of the virtual plane. However, the tangential direction at only one of them may agree.

Virtual Plane

Figure 7:
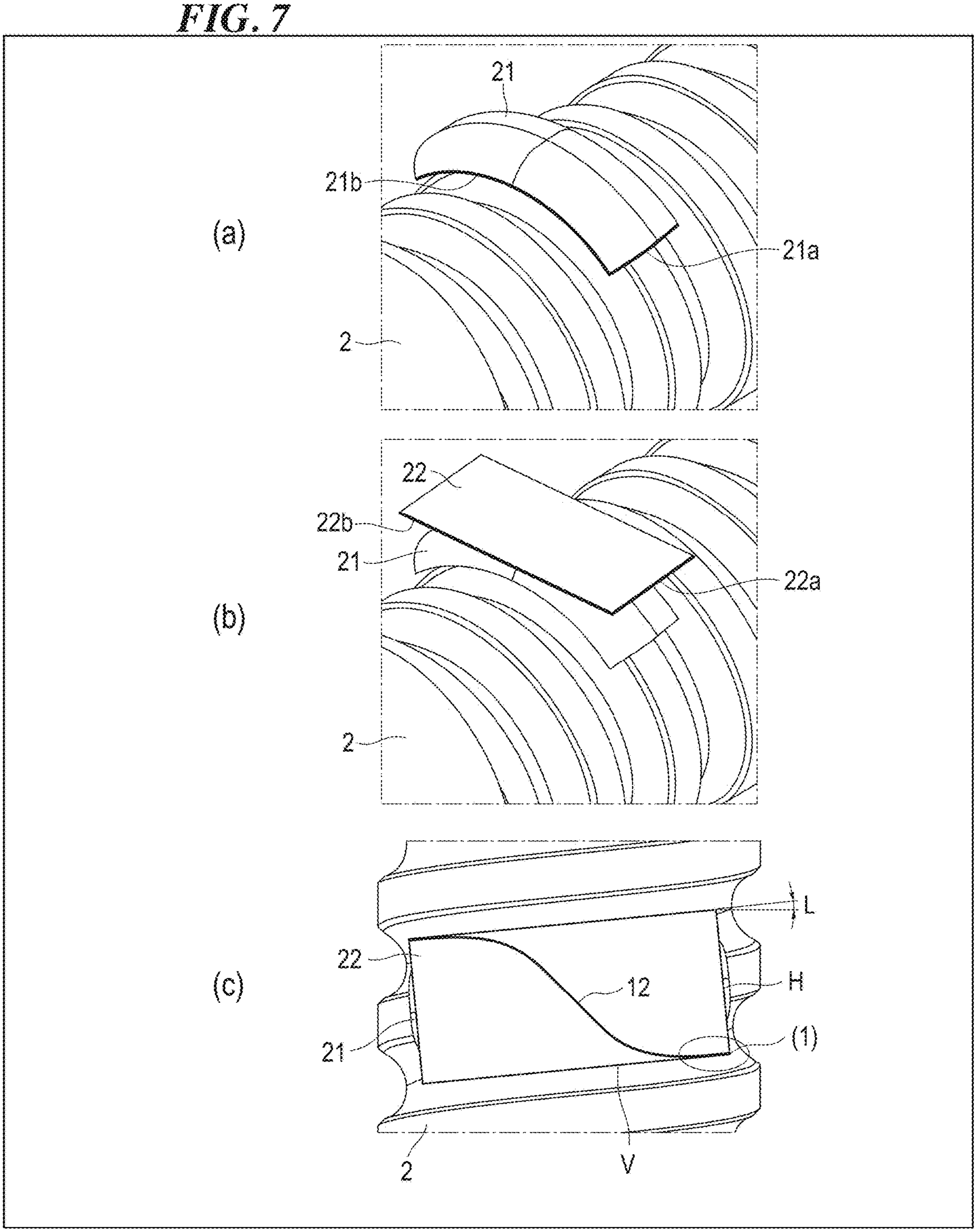
FIG. 7 is conceptual diagrams of a virtual plane (FIGS. 7(*a*) and 7(*b*) are perspective views of the ball screw shaft, and FIG. 7(*c*) is a plan view of the ball screw shaft).

A concept of the virtual plane is described below. FIG. 7(*a*) schematically illustrates a curved surface 21 drawn on the ball screw shaft 2. A short side 21*a* of the curved surface 21 represents the cross-sectional trajectory curve 11, and a long side 21*b* of the curved surface 21 represents the helical trajectory length $F_v(\omega)$. The length of the short side 21*a* of the curved surface 21 agrees with the total length α of the cross-sectional trajectory curve 11, and the length of the long side 21*b* of the curved surface 21 agrees with the total length β of the helical trajectory length $F_v(\omega)$. As illustrated in FIG. 7(*b*), a virtual plane 22 is obtained by developing the curved surface 21 in a plane. The length of a short side 22*a* of the virtual plane 22 agrees with the total length α of the axial cross-sectional trajectory curve 11, and the length of a long side 22*b* of the virtual plane 22 agrees with the total length β of the helical trajectory length $F_v(\omega)$. As illustrated in FIG. 7(*c*), the virtual plane is inclined by the lead angle in plan view of the ball screw shaft 2.

The virtual plane 22 illustrated in FIG. 7(*c*) corresponds to the virtual plane (VH plane) illustrated in FIG. 5. A reference numeral 12 of FIG. 7(*c*) denotes the longitudinal trajectory curve drawn on the virtual plane 22. As described above, the tangential direction to the longitudinal trajectory curve 12 at the turn start point (1) substantially agrees with the V-axis direction of the virtual plane 22 (refer to a portion encircled by an ellipse of FIG. 7(*c*)).

Conversion to XYZ Coordinates of Ball Screw

The principal normal direction coordinate $F_n(\omega)$ of the groove cross-sectional trajectory curve 11, the binormal direction coordinate $F_b(\omega)$ of the groove cross-sectional trajectory curve 11, and the helical trajectory length $F_v(\omega)$ of the longitudinal trajectory curve 12 are converted to XYZ coordinates of the ball screw 1, using the Frenet-Serret frame including a set of three unit vectors T, N, and B indicating a tangential direction, a principal normal direction, and a binormal direction to the helical trajectory 7.

Figure 8:
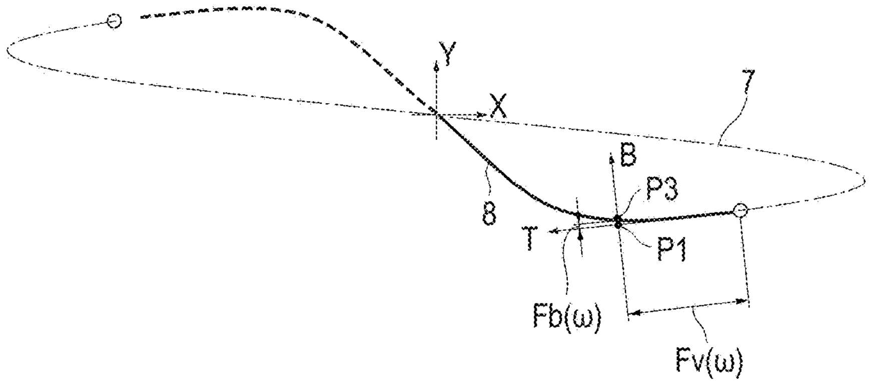
FIG. 8 is diagrams illustrating an XYZ coordinate system of the ball screw of the embodiment (FIG. 8(*a*) illustrates an XY plane of the ball screw, and FIG. 8(*b*) illustrates an XZ plane of the ball screw).
Figure 8:
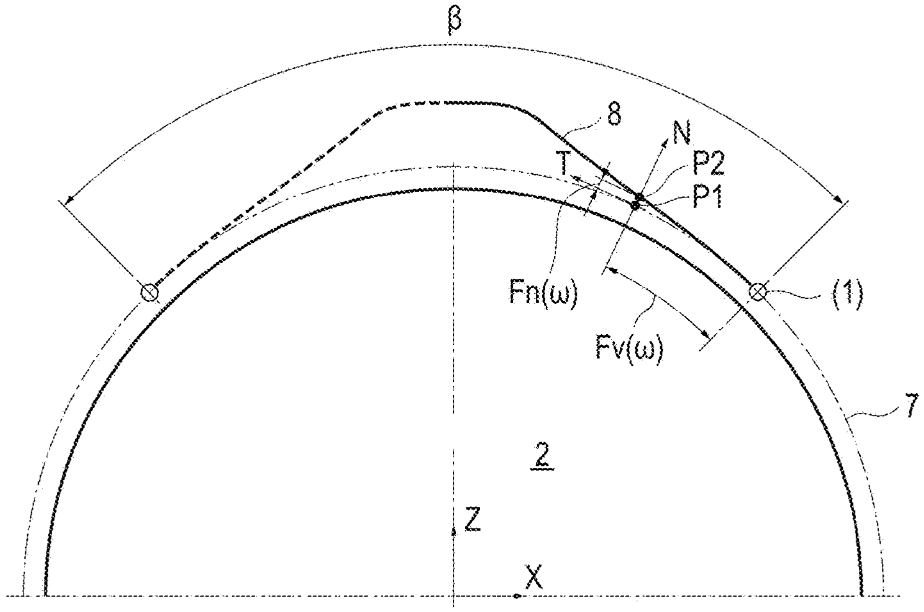

Firstly, as illustrated in an XZ plane of the ball screw 1 of FIG. 8(*b*), the helical trajectory length $F_v(\omega)$ of the longitudinal trajectory curve 12 illustrated in FIG. 5 is set at the helical trajectory length $F_v(\omega)$ of the recirculation trajectory 8 from the turn start point (1), and a point P1 on the helical trajectory 7 where the helical trajectory length from the turn start point (1) is $F_v(\omega)$ is obtained. Here, the point P1 where the helical trajectory length from the turn start point (1) along the helix is $F_v(\omega)$ is obtained.

Next, as illustrated in the XZ plane of the ball screw 1 of FIG. 8(*b*), the principal normal direction coordinate En (ω) of the groove cross-sectional trajectory curve 11 illustrated in FIG. 4 is set as a principal normal direction coordinate $F_n(\omega)$ to the helical trajectory length $F_v(\omega)$ of the recirculation trajectory 8, and a point P2 moved by $F_n(\omega)$ in the principal normal direction (the direction N) from the point P1 on the helical trajectory 7 is obtained.

Next, as illustrated in an XY plane of the ball screw 1 of FIG. 8(*a*), the binormal direction coordinate $F_b(\omega)$ of the groove cross-sectional trajectory curve 11 illustrated in FIG. 4 is set as a binormal direction coordinate $F_b(\omega)$ to the helical trajectory length $F_v(\omega)$, and a point P3 moved by $F_b(\omega)$ in the binormal direction (the direction B) from the point P1 on the helical trajectory 7 is obtained.

The recirculation trajectory 8 is located on the point P2 in the XZ plane of the ball screw 1 illustrated in FIG. 8(*b*) and is located on the point P3 in the XY plane of the ball screw 1 illustrated in FIG. 8(*a*). Therefore, the recirculation trajectory 8 can be obtained from the points P2 and P3.

The groove cross-sectional trajectory curve 11 and the longitudinal trajectory curve 12 are aggregates of points. Therefore, the three-dimensional recirculation trajectory 8 illustrated in FIG. 10 can be formed by changing ω to ω1, ω2, ω3 . . . obtaining ($F_v(\omega 1)$, $F_n(\omega 1)$, $F_b(\omega 1)$), ($F_v(\omega 2)$, $F_n(\omega 2)$, $F_b(\omega 2)$), ($F_v(\omega 3)$, $F_n(\omega 3)$, $F_b(\omega 3)$) . . . , converting them to the XYZ coordinates of the ball screw 1 to obtain the respective points P1, P2, and P3, connecting the points P2, and connecting the points P3.

Figure 9:
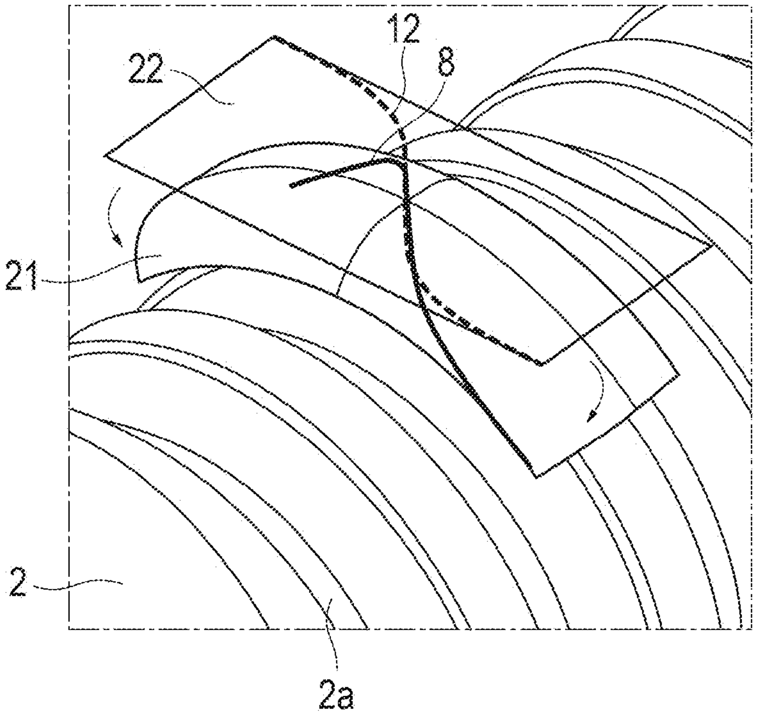
FIG. 9 is a conceptual diagram illustrating a state in which the virtual plane is wound.

The conversion of $F_v(\omega)$, $F_n(\omega)$, and $F_b(\omega)$ to the XYZ coordinates of the ball screw 1 as described above means that the virtual plane 22 is wound to return to the first curved surface 21 as illustrated in FIG. 9. The winding of the virtual plane 22 makes the longitudinal trajectory curve 12 (indicated by a broken line in the figure) drawn on the virtual plane 22 three-dimensional, and enables the formation of the three-dimensional recirculation trajectory 8.

As illustrated in FIG. 7(*c*), the tangential direction to the longitudinal trajectory curve 12 at the turn start point (1) in the virtual plane 22 substantially agrees with the V-axis direction of the virtual plane 22. Hence, as illustrated in FIG. 9, it is possible to ensure that also in the curved surface 21 obtained by winding the virtual plane 22, the tangential direction to the longitudinal trajectory curve 12 at the turn start point (1) substantially agrees with the V-axis direction of the curved surface 21, and it is possible to ensure that the tangential direction to the three-dimensional recirculation trajectory 8 illustrated in FIG. 10 is substantially continuous with the tangential direction to the helical trajectory 7 at the turn start point (1).

Figure 10:
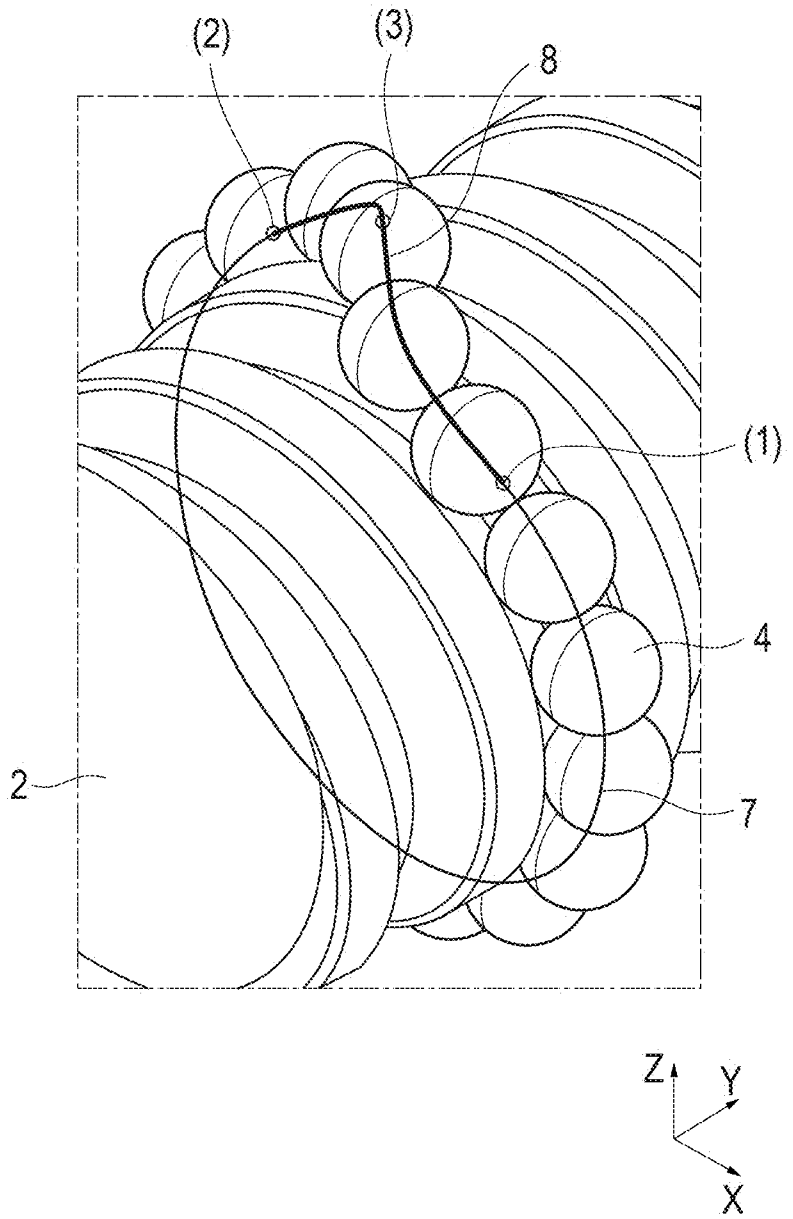
FIG. 10 is a perspective view illustrating a recirculation trajectory of the ball screw of the embodiment.

After the recirculation trajectory 8 illustrated in FIG. 10 is formed, the recirculation groove 3*b* needs only be formed in such a manner that the balls 4 are placed along the recirculation trajectory 8 and that the balls 4 move along the recirculation trajectory 8. Specifically, the balls 4 move in an unloaded state at a middle portion of the recirculation groove 3*b* in a length direction thereof (on the crest 2*b* of the ball screw shaft 2), and slight play exists around the balls 4. Hence, the recirculation groove 3*b* needs only be formed in such a manner that the center of the play of the balls 4 forms the recirculation trajectory 8 at the middle portion of the recirculation groove 3*b* in the length direction. On the other hand, the balls 4 are picked up, sandwiched between the recirculation groove 3*b* of the ball nut 3 and the helical groove 2*a* of the ball screw shaft 2, in a pick-up portion at each end portion of the recirculation groove 3*b* in the length direction. In the pick-up portions, the recirculation groove 3*b* needs only be formed in such a manner that the trajectory of the balls 4 sandwiched between the recirculation groove 3*b* of the ball nut 3 and the helical groove 2*a* of the ball screw shaft 2 forms the recirculation trajectory 8.

However, the recirculation trajectory 8 may be corrected to smoothly pick up the balls 4, or there may be machining errors in the recirculation groove 3*b* of the ball nut 3 and the helical groove 2*a* of the ball screw shaft 2. That the tangential directions to the recirculation trajectory 8 and the helical trajectory 7 are "substantially" continuous means that such cases are also included. Moreover, that the tangential direction to the longitudinal trajectory curve 12 at the turn start point and/or the turn end point in the virtual plane "substantially" agrees with the V-axis direction of the virtual plane means that such cases are also included.

Effects

The configuration of the ball screw 1 of the embodiment has been described above. The ball screw of the embodiment has the following effects.

The recirculation trajectory 8 of the recirculation groove 3*b* is formed on the basis of the groove cross-sectional trajectory curve 11 and the longitudinal trajectory curve 12. Therefore, the three-dimensional recirculation trajectory 8 of the recirculation groove 3*b* can be connected to the helical trajectory 7 in such a manner that the tangential directions are substantially continuous.

In the virtual plane, the tangential direction to the longitudinal trajectory curve 12 at the turn start point and/or the turn end point substantially agrees with the V-axis direction of the virtual plane. Therefore, it is possible to ensure that the tangential directions to the recirculation trajectory 8 and the helical trajectory 7 are substantially continuous at the turn start point and/or the turn end point of the three-dimensional recirculation trajectory 8.

In the virtual plane, the turn trajectory width of the longitudinal trajectory curve 12 in the H-axis direction agrees with the total length a of the groove cross-sectional trajectory curve 11, and the turn trajectory width of the longitudinal trajectory curve 12 in the V-axis direction agrees with the total length β of the helical trajectory length $F_v(\omega)$. Therefore, the recirculation trajectory 8 of the recirculation groove 3*b* can be smoothly formed throughout its entire length.

EXAMPLES (Groove Cross-Sectional Trajectory Curve)

Figure 11:
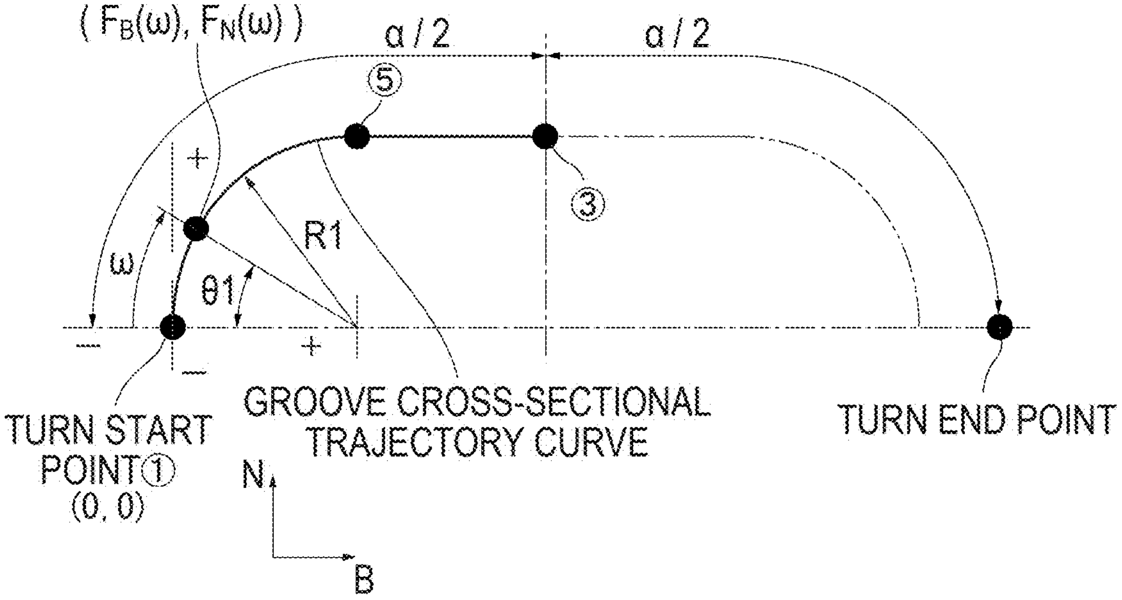
FIG. 11 is a diagram illustrating the groove cross-sectional trajectory curve of an example.

As illustrated in FIG. 11, the groove cross-sectional trajectory curve 11 was drawn with a single arc having a radius R1 and a straight line in the groove cross-section (BN plane) of the ball screw shaft 2. (1) denotes the turn start point, (3) denotes a midpoint about which the groove cross-sectional trajectory curve 11 is symmetrical, (5) denotes a curvature change point, α denotes the total length (mm) of the groove cross-sectional trajectory curve 11, R1 denotes a groove cross-sectional trajectory radius (mm), θ1 denotes a turn start angle (rad), and ω denotes a variable (0→α).

The coordinates ($F_B(\omega)$, $F_N(\omega)$) of the groove cross-sectional trajectory curve 11 are expressed as follows:

Sections 1 to 5

$$F_B(\omega) = R_1 - R_1 \cos\theta_1$$
$$\theta_1 = \frac{\omega}{R_1\pi}\cdot 180^\circ$$
$$F_N(\omega) = R_1 \sin\theta_1$$

Sections 5 to 3

$$F_B(\omega) = \omega - \frac{R_1\pi}{2} + R_1$$
$$F_N(\omega) = R_1$$

(Longitudinal Trajectory Curve)

Figure 12:
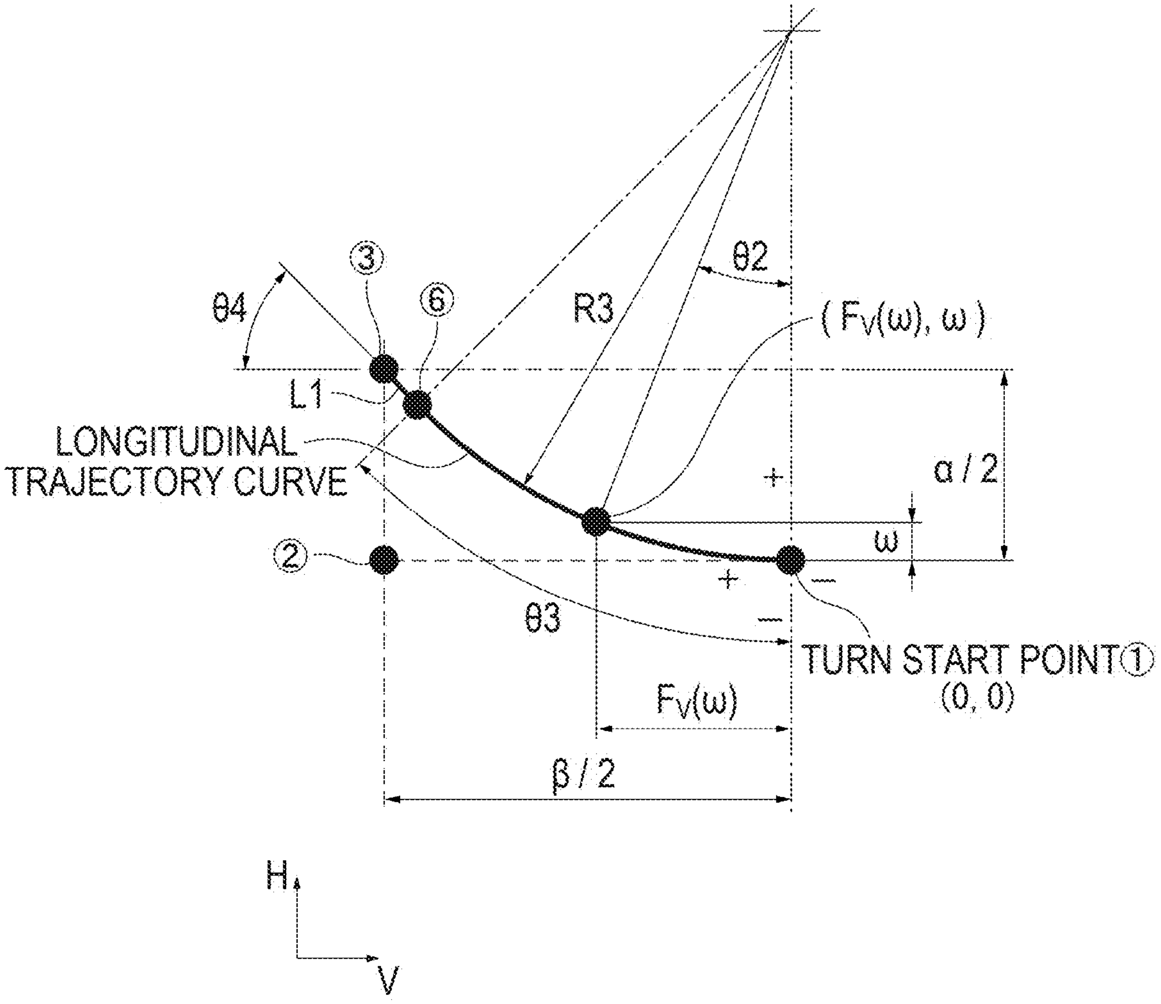
FIG. 12 is a diagram illustrating the longitudinal trajectory curve of the example.

As illustrated in FIG. 12, the longitudinal trajectory curve 12 was drawn with a single arc having a radius R3 and a straight line in the virtual plane (VH plane). It was set in such a manner the tangential direction to the longitudinal trajectory curve 12 agreed with the V-axis direction at the turn start point (1). (1) denotes the turn start point, (2) denotes the end point of $F_v(\omega)$, (3) denotes the midpoint about which the longitudinal trajectory is symmetrical, (6) denotes the curvature change point, β denotes the total length (mm) of the helical trajectory length, R3 denotes the longitudinal trajectory radius (mm), θ2 denotes a longitudinal trajectory arc position (rad), θ3 denotes a longitudinal trajectory arc range (rad), θ4 denotes a longitudinal trajectory inclination angle (rad), and L1 denotes a longitudinal trajectory straight-line distance (mm).

The helical trajectory length $F_v(\omega)$ of the longitudinal trajectory curve 12 for the variable ω is expressed as follows:

Sections 1 to 6

$$F_V(\omega) = R_3 \sin\theta_2$$
$$\theta_2 = \cos^{-1}\left(\frac{R_3 - \omega}{R_3}\right)$$

Sections 6 to 3

$$F_V(\omega) = (\omega - R_3 + R_3\cos\theta_3)\cos\theta_4 + R_3\sin\theta_3$$
$$= \frac{\beta}{2} - \left(\frac{\alpha}{2} - \omega\right)\tan\theta_4$$

(Recirculation Trajectory of Recirculation Groove)

$F_V(\omega)$, $F_N(\omega)$, and $F_B(\omega)$ were converted to the XYZ coordinates of the ball screw 1. In other words, the three-dimensional recirculation trajectory 8 illustrated in FIG. 13(*c*) was formed by changing ω to ω1, ω2, ω3 . . . , obtaining ($F_V$(ω1), $F_N$(ω1), $F_B$(ω3)), ($F_V$(ω2), $F_N$(ω2), $F_B$(ω2)), ($F_V$(ω3), $F_N$(ω3), $F_B$(ω3)) . . . , converting them to the XYZ coordinates of the ball screw 1 to obtain the respective points P1, P2, and P3, connecting the points P2, and connecting the points P3.

Figure 13:
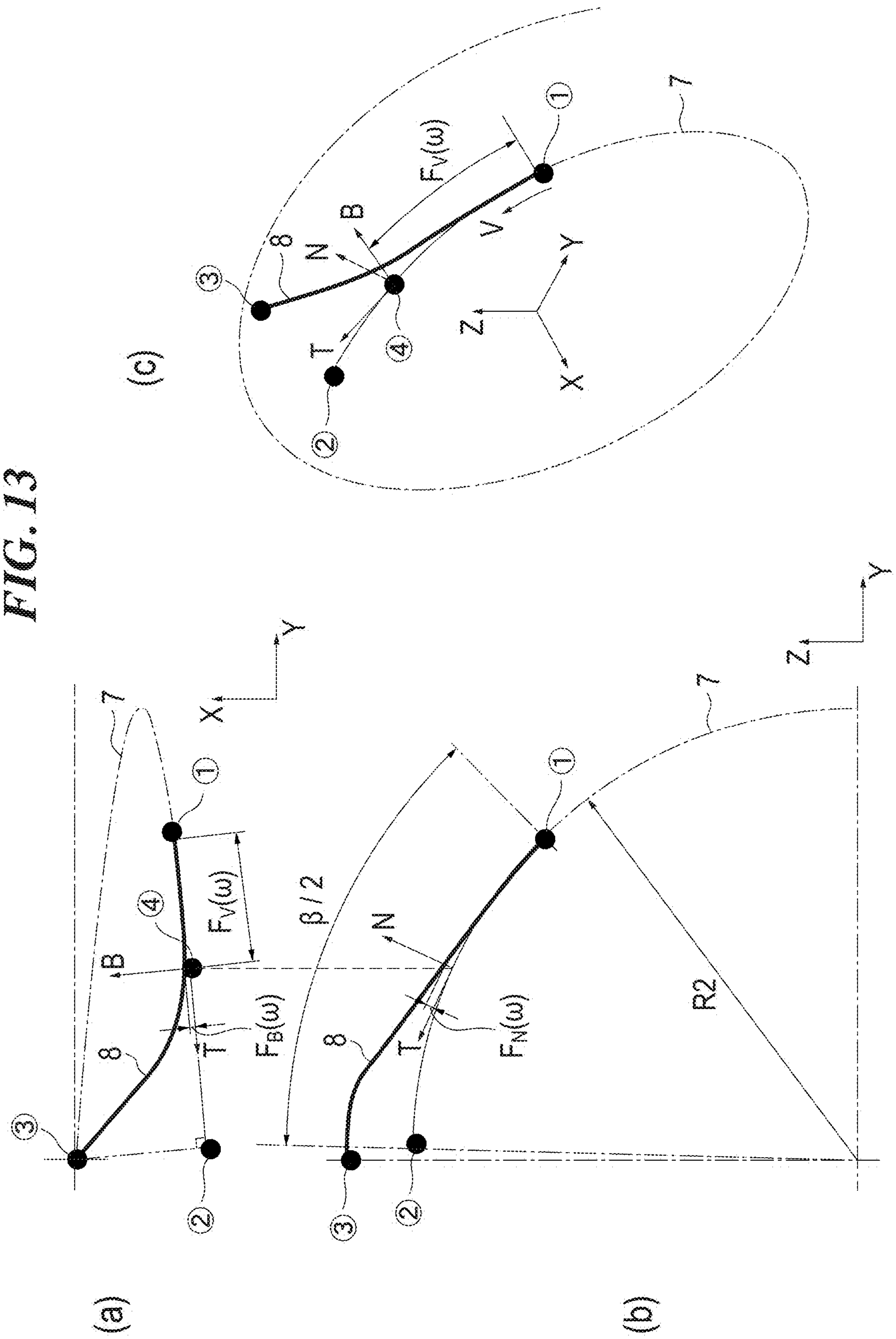
FIG. 13 is diagrams illustrating the recirculation trajectory of the example (FIG. 13(*a*) illustrates the XY plane of the ball screw, FIG. 13(*b*) illustrates a YZ plane of the ball screw, and FIG. 13(*c*) illustrates XYZ coordinates of the ball screw).
Figure 14:
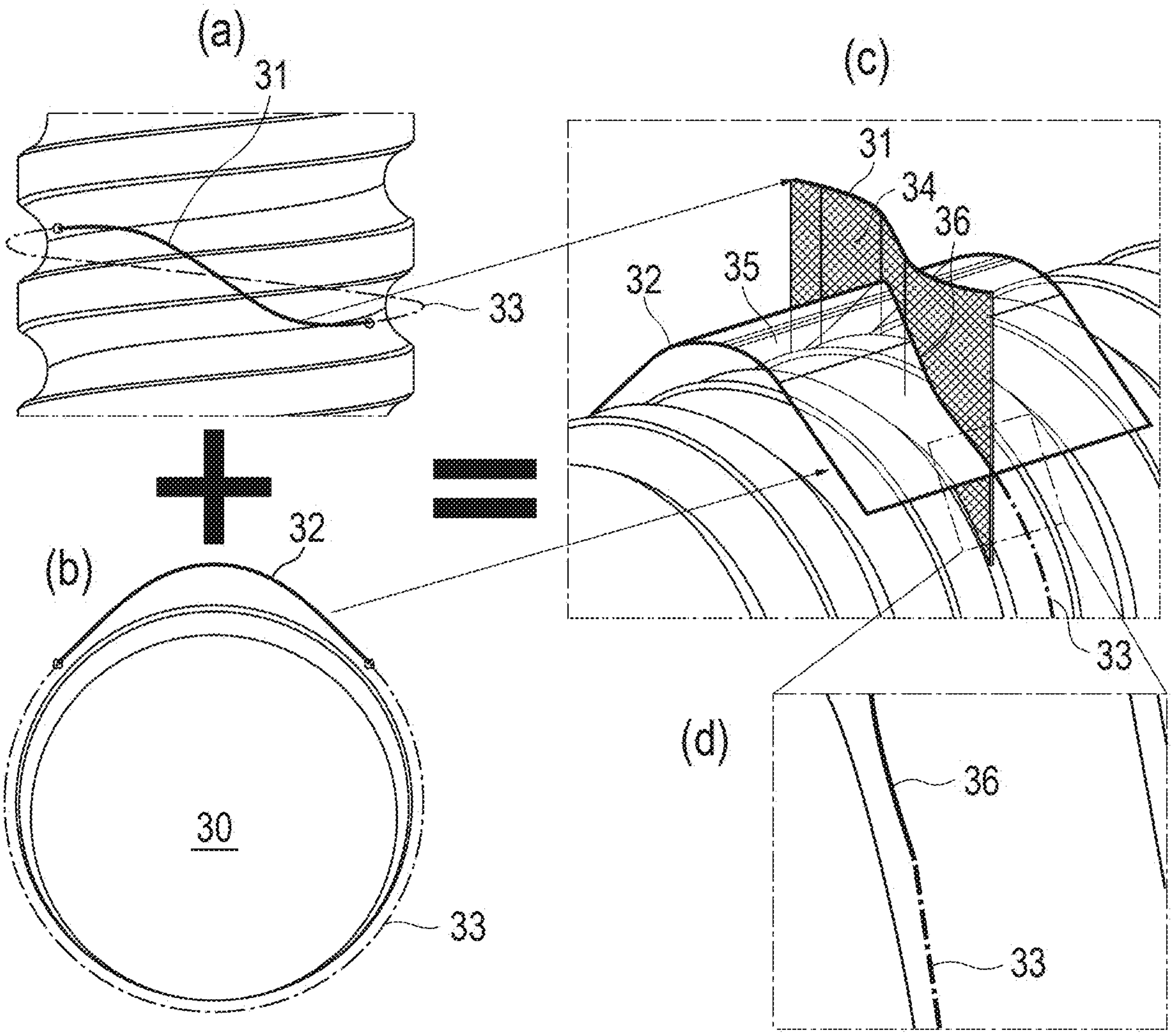
FIG. 14 is diagrams for explaining a recirculation trajectory of a known ball screw (FIG. 14(*a*) illustrates an axial horizontal plane, FIG. 14(*b*) illustrates a normal cross-section, FIG. 14(*c*) is a perspective view of a ball screw shaft, and FIG. 14(*d*) is an enlarged view of a part of FIG. 14(*c*)).

In FIGS. 13(*a*), 13 (*b*), and 13 (*c*), (1) denotes the turn start point, (2) denotes the end point of $F_V(\omega)$, (3) denotes the midpoint about which the recirculation trajectory 8 is symmetrical, (4) denotes a point on the helical trajectory 7 having the turn start point (1) as a starting point and having the length $F_V(\omega)$. R2 denotes an axial cross-sectional helical trajectory radius (mm). T, N, and B are a tangential direction (T), a normal direction (N), and a binormal direction (B) at a point (4), respectively.

The obtained recirculation trajectory 8 was connected to the helical trajectory 7 in such a manner that the tangential directions were continuous at the turn start point (1), and also the recirculation trajectory 8 itself was smooth.

The present description is based on Japanese Patent Application No. 2022-149823 filed on Sep. 21, 2022. The entire contents thereof are incorporated herein.

REFERENCE SIGNS LIST

1 Ball screw
2 Ball screw shaft
2*a* Helical groove of the ball screw shaft
3 Ball nut
3*a* Helical groove of the ball nut
3*b* Recirculation groove
4 Ball
7 Helical trajectory
8 Recirculation trajectory
11 Groove cross-sectional trajectory curve
12 Longitudinal trajectory curve
22 Virtual plane
(1) Turn start point
(2) Turn end point

The invention claimed is:

1. A ball screw comprising:

a ball screw shaft including a helical groove;

a ball nut including a helical groove; and a plurality of balls placed between the helical groove of the ball screw shaft and the helical groove of the ball nut, the ball nut being provided with a recirculation groove that is connected to one end and another end of the helical groove of the ball nut to recirculate the balls, wherein a recirculation trajectory of the recirculation groove is formed on the basis of a groove cross-sectional trajectory curve representing a trajectory along which the balls are recirculated in a groove cross-section of the ball screw shaft, and a longitudinal trajectory curve representing a trajectory along which the balls are recirculated in a virtual plane where a trajectory length ω of the groove cross-sectional trajectory curve is an H-axis and a helical trajectory length $F_v(\omega)$ is a V-axis, the groove cross-sectional trajectory curve is a curve representing a trajectory along which the balls are caused to climb over a crest of the ball screw shaft and move from the helical groove of the ball screw shaft to the adjacent helical groove of the ball screw shaft from a turn start point to a turn end point, the longitudinal trajectory curve is a curve representing a trajectory along which the balls are moved from the helical groove of the ball screw shaft to the adjacent helical groove of the ball screw shaft from the turn start point to the turn end point, the helical trajectory length $F_v(\omega)$ of the longitudinal trajectory curve from the turn start point is set as a helical trajectory length of the recirculation trajectory of the recirculation groove from the turn start point, a principal normal direction coordinate $F_n(\omega)$ of the groove cross-sectional trajectory curve is set as a principal normal direction coordinate to the helical trajectory length $F_v(\omega)$ of the recirculation trajectory of the recirculation groove, and a binormal direction coordinate $F_b(\omega)$ of the groove cross-sectional trajectory curve is set as a binormal direction coordinate to the helical trajectory length $F_v(\omega)$ of the recirculation trajectory of the recirculation groove.

2. The ball screw according to claim 1, wherein in the virtual plane, a tangential direction to the longitudinal trajectory curve at the turn start point and/or the turn end point substantially agrees with a V-axis direction of the virtual plane.

3. The ball screw according to claim 1, wherein in the virtual plane, a turn trajectory width of the longitudinal trajectory curve in an H-axis direction agrees with a total length (α) of the groove cross-sectional trajectory curve, and a turn trajectory width of the longitudinal trajectory curve in the V-axis direction agrees with a total length (β) of the helical trajectory length $F_v(\omega)$.

4. The ball screw according to claim 2, wherein in the virtual plane, a turn trajectory width of the longitudinal trajectory curve in an H-axis direction agrees with a total length (α) of the groove cross-sectional trajectory curve, and a turn trajectory width of the longitudinal trajectory curve in the V-axis direction agrees with a total length (β) of the helical trajectory length $F_v(\omega)$.

* * * * *